US011250410B2

(12) United States Patent
Mokhasi et al.

(10) Patent No.: US 11,250,410 B2
(45) Date of Patent: Feb. 15, 2022

(54) COMPUTER IMPLEMENTED METHOD AND A PAYMENT TERMINAL FOR EXECUTING CARD PRESENT TRANSACTION DYNAMICALLY FROM REMOTE ENVIRONMENT

(71) Applicant: Visa International Service Association, San Francisco, CA (US)

(72) Inventors: Gaurav Srikant Mokhasi, Bengaluru (IN); Rohit Sukhija, Bengaluru (IN); Abhishek Minocha, New Delhi (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/567,434

(22) Filed: Sep. 11, 2019

(65) Prior Publication Data
US 2021/0073781 A1 Mar. 11, 2021

(51) Int. Cl.
*G06Q 20/32* (2012.01)
*G06Q 20/20* (2012.01)

(52) U.S. Cl.
CPC ....... *G06Q 20/3223* (2013.01); *G06Q 20/202* (2013.01); *G06Q 20/204* (2013.01)

(58) Field of Classification Search
CPC .................................................. G06Q 20/3223
USPC .......................................................... 235/379
See application file for complete search history.

(56) References Cited

U.S. PATENT DOCUMENTS

| 6,360,138 B1* | 3/2002 | Coppola | G06Q 20/341 |
| | | | 700/231 |
| 2009/0043696 A1* | 2/2009 | Ornce | G06Q 20/425 |
| | | | 705/39 |

* cited by examiner

*Primary Examiner* — Rafferty D Kelly
(74) *Attorney, Agent, or Firm* — The Webb Law Firm (57) ABSTRACT

The present invention relates to a system and computer implemented method for executing card present transaction dynamically from remote environment. A first payment terminal receives payment details and configuration information of a second payment terminal associated with a merchant located separate from the first payment terminal from an intermediate agent device. A payment channel is initiated by emulating the second payment terminal using the configuration details. The first payment terminal receives transaction related data once user initiates the payment transaction using a physical payment card in the first payment terminal. The transaction related data is communicated to the second payment terminal which sends a transaction message comprising transaction related data to an issuer system for authorization. Thereafter, a result of the payment transaction is received from the second payment terminal via the intermediate agent device.

12 Claims, 6 Drawing Sheets

COMPUTER IMPLEMENTED METHOD AND A PAYMENT TERMINAL FOR EXECUTING CARD PRESENT TRANSACTION DYNAMICALLY FROM REMOTE ENVIRONMENT

TECHNICAL FIELD

The present disclosure relates to the field of payment processing system, and more specifically execution of card present transaction dynamically from remote environment.

BACKGROUND

Payment systems have undergone evolution in recent years. With proliferation of internet industry, more and more products and services are available to users in a variety of non-traditional systems such as, internet, telephone sales, interactive TV, and the like. Typically, payment transaction can be "card present" transaction and "card not present transaction".

Transactions in which a user payment device is presented to a merchant or accessed by a point of sale terminal are termed as "card present" transactions since the payment device is in same physical location as the merchant or terminal. Whereas, the "card not present" transaction is a payment card transaction made where the user/cardholder does not or cannot physically present the card for a visual examination of the merchant at the time that an order is given. It is most commonly used for payments made over internet, but also include, transactions by mail or fax, or over the telephone and the like. For example, a card not present transaction involving a purchase of product or service may be initiated by a user by providing payment data from a remote location to a merchant over a network such as the Internet.

Today, with penetration of more and more virtual reality devices, there may be less incentive for users to step out of home and make payment in external retail environment. Thus, the "card not present" transaction is a common transaction type in current scenario. However, on the contrary, a purely virtual experience may not be better than an online transaction since the virtual experience is disconnected from shipping of actual goods. Also, "card not present transactions" have had a higher chance of fraud, because it is difficult for a merchant to verify that if an actual cardholder is indeed authorizing a purchase. Further, in such type of transactions, no guarantee is provided primarily because payers are not authenticated in such non face-to-face transactions, thereby allowing many risks to accompany the "card not present transactions". Such risks involve issues such as chargebacks of payment transactions to online merchants, fraud for both merchants and cardholders, increased exception item processing expenses for banks.

Thus, unlike a typical "card-present" transaction where a user is present at a merchant's retail establishment and presents a physical charge card to the merchant, the merchant in an online or other remote transaction does not physically see the user nor the charge card of the user. As such, in an online transaction, the merchant is not typically able to appropriately verify the charge number on the card, the signature/photograph on the card, and does not have sufficient capability to ask for other forms of identification. Currently there exist no seamless way for the user to conduct the card present transaction at a real-world merchant from a remote environment.

Thus, what is needed is a secure and efficient environment for conducting card present transaction when merchant and user are geographically separated.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a computer implemented method for executing a card present transaction dynamically from a remote environment. In an embodiment, the method may include receiving payment details and configuration information of a second payment terminal associated with a merchant located separate from the first payment terminal from an intermediate agent device. The intermediate agent device receives the payment details and configuration information from the second payment terminal upon initiating a transaction after receiving a confirmation from a user for performing a payment transaction. Further, the method may include initiating, by the first payment terminal, a payment channel by emulating the second payment terminal using the configuration information. The confirmation regarding the initiation of the payment channel is transmitted to the intermediate agent device. Further, the method may include receiving, by the first payment terminal, transaction related data upon the user initiating the payment transaction using a physical payment card in the first payment terminal. The transaction related data is communicated to the second payment terminal via the intermediate agent device. Thereafter, the method may include receiving, by the first payment terminal, a result of the payment transaction from the second payment terminal via the intermediate agent device. The second payment terminal sends a transaction message comprising transaction related data to an issuer system for authorization upon receiving the transaction related data from the intermediate agent device.

In another embodiment, the present disclosure discloses a computer implemented method for dynamic merchant configuration in a payment terminal for transacting in a virtual environment. The method includes authenticating, by a second payment terminal associated with a merchant, an intermediate agent device present at the merchant upon receiving one or more requests from the intermediate agent device for a payment transaction. The method includes providing, by the second payment terminal, payment details and configuration information to the intermediate agent device upon authentication for sending to a first payment terminal located at a location of a user. The method includes receiving, by the second payment terminal, transaction related data from the first payment terminal via the intermediate agent device upon establishment of a payment channel by the first payment terminal, wherein the transaction related data is captured when the user initiates payment for the payment transaction using a physical payment card in the first payment terminal. Furthermore, the method includes sending, by the second payment terminal, a transaction message comprising transaction related data to an issuer system for authorization upon receiving the transaction related data from the intermediate agent device. Thereafter, the method includes providing, by the second payment terminal, result of the payment transaction via the intermediate agent device to the first payment terminal upon receiving from the issuer system.

Furthermore, the present disclosure includes a first payment terminal, for dynamic merchant configuration in a payment terminal for transacting in a virtual environment. The payment terminal includes a processor and a memory communicatively coupled to the processor. The memory stores processor instructions, which, on execution, causes the processor to receive payment details and configuration information of a second payment terminal associated with a merchant located separate from the first payment terminal from an intermediate agent device. The intermediate agent device receives the payment details and configuration information from the second payment terminal upon initiating a transaction after receiving a confirmation from a user for performing a payment transaction. The processor initiates a payment channel by emulating the second payment terminal using the configuration details. The confirmation regarding the initiation of the payment channel is transmitted to the intermediate agent device. Further, the processor receives transaction related data upon the user initiating the payment transaction using a physical payment card in the first payment terminal. The transaction related data is communicated to the second payment terminal via the intermediate agent device. Thereafter, the processor receives a result of the payment transaction from the second payment terminal via the intermediate agent device. The second payment terminal sends a transaction message comprising transaction related data to an issuer system for authorization upon receiving the transaction related data from the intermediate agent device.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The example embodiment(s) of the present invention are illustrated by way of example, and not in way by limitation, in the figures of the accompanying drawings and in which like reference numerals refer to similar elements and in which.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

Embodiments of the present disclosure are directed to a computer implemented method and a first payment terminal for executing a card present transaction dynamically from a remote environment. With advancement in internet technology, e-commerce and introduction of virtual reality devices, online transaction/remote transaction has become a common mode of payment transaction for users. The online transaction and/or remote transaction involves "card not present transaction", wherein the users and/or cardholders cannot physically present card for a visual examination to a merchant involved in the transaction. Though, multiple security levels are provided for online transaction, "card not present transaction" still involves high fraud risks. Examples of risks include, unauthorized use of stolen account information to purchase goods and services online, fabrication of card account numbers to make fraudulent online purchases, and extraction of clear text account information from network traffic.

The present disclosure involves the first payment terminal for executing a card present transaction from a remote environment. The first payment terminal may be a dedicated Point of Sale (POS) device associated with users for performing a payment transaction from remote location. While requesting for a payment transaction from a merchant, the first payment terminal receives payment details and configuration information of a second payment terminal associated with the merchant which is located separately from the first payment terminal. The payment details and configuration information are received through an intermediate agent device which is a physical device and may be preregistered with the user. The first payment terminal emulates the second payment terminal using the configuration details to initiate a payment channel and a confirmation regarding the initiation of the payment channel is transmitted to the intermediate agent device. In an embodiment, upon initiating the payment channel, the user may be requested to initiate the payment transaction. Thus, the first payment terminal may receive transaction related data upon the user initiating the payment transaction using a physical payment card in the first payment terminal. The transaction related data is communicated to the second payment terminal which may send a transaction message comprising the transaction related data to an issuer system for authorization. Thereafter, the first payment terminal may receive a result of the payment transaction from the second payment terminal via the intermediate agent device.

Embodiments of the present disclosure have several advantages. For example, embodiments improve security of payment transactions. Furthermore, embodiments are more convenient to users because the first payment terminal allows users to make the card present transaction from any location. Previously, remote transactions required users to make payment through card not present transaction. Accordingly, embodiments provide a more secure and convenient method for users for payment transactions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
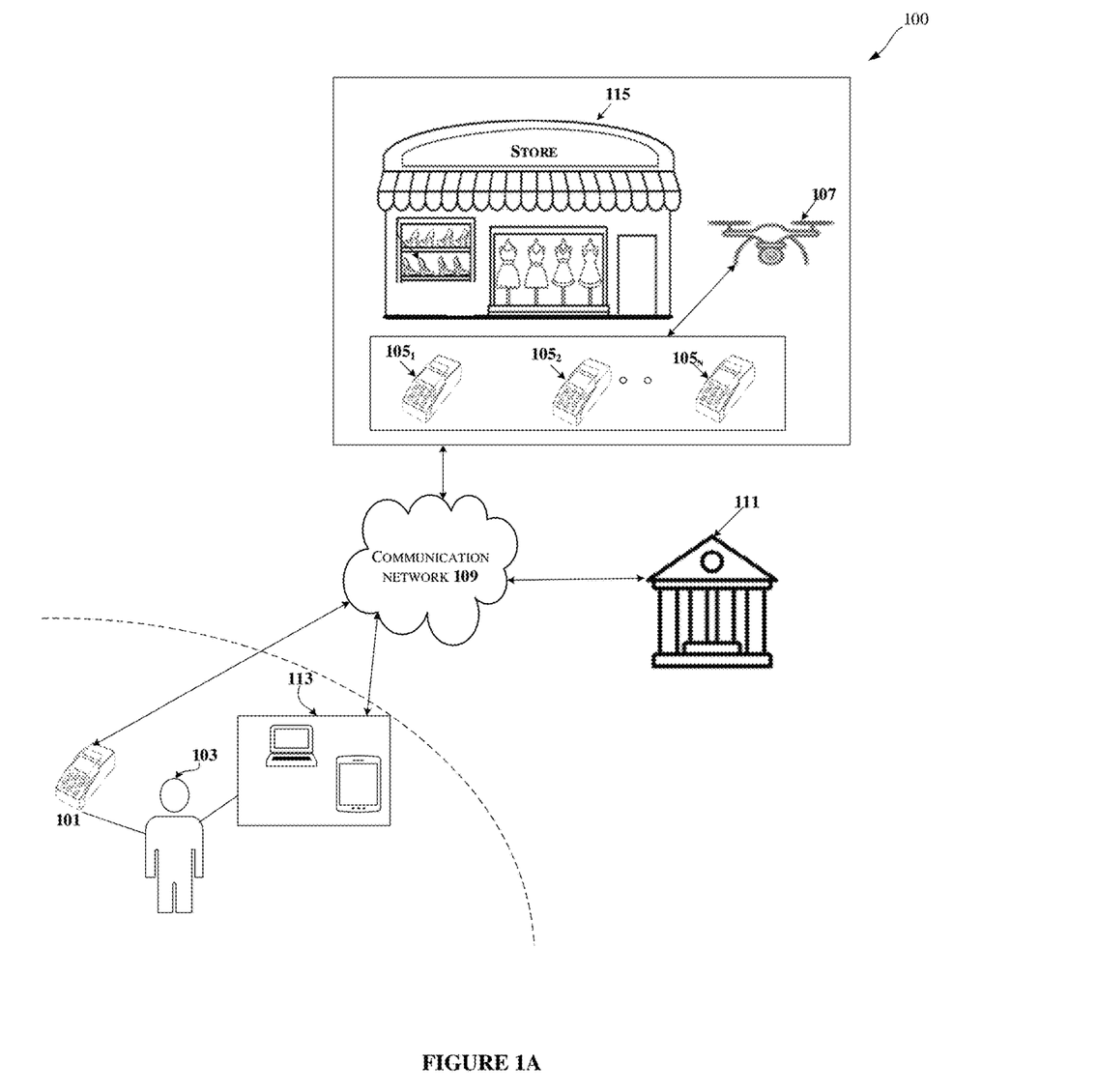
FIG. 1A and FIG. 1B show an exemplary environment for executing card present transaction from a remote environment, in accordance with an embodiment of the present disclosure.
Figure 1B:
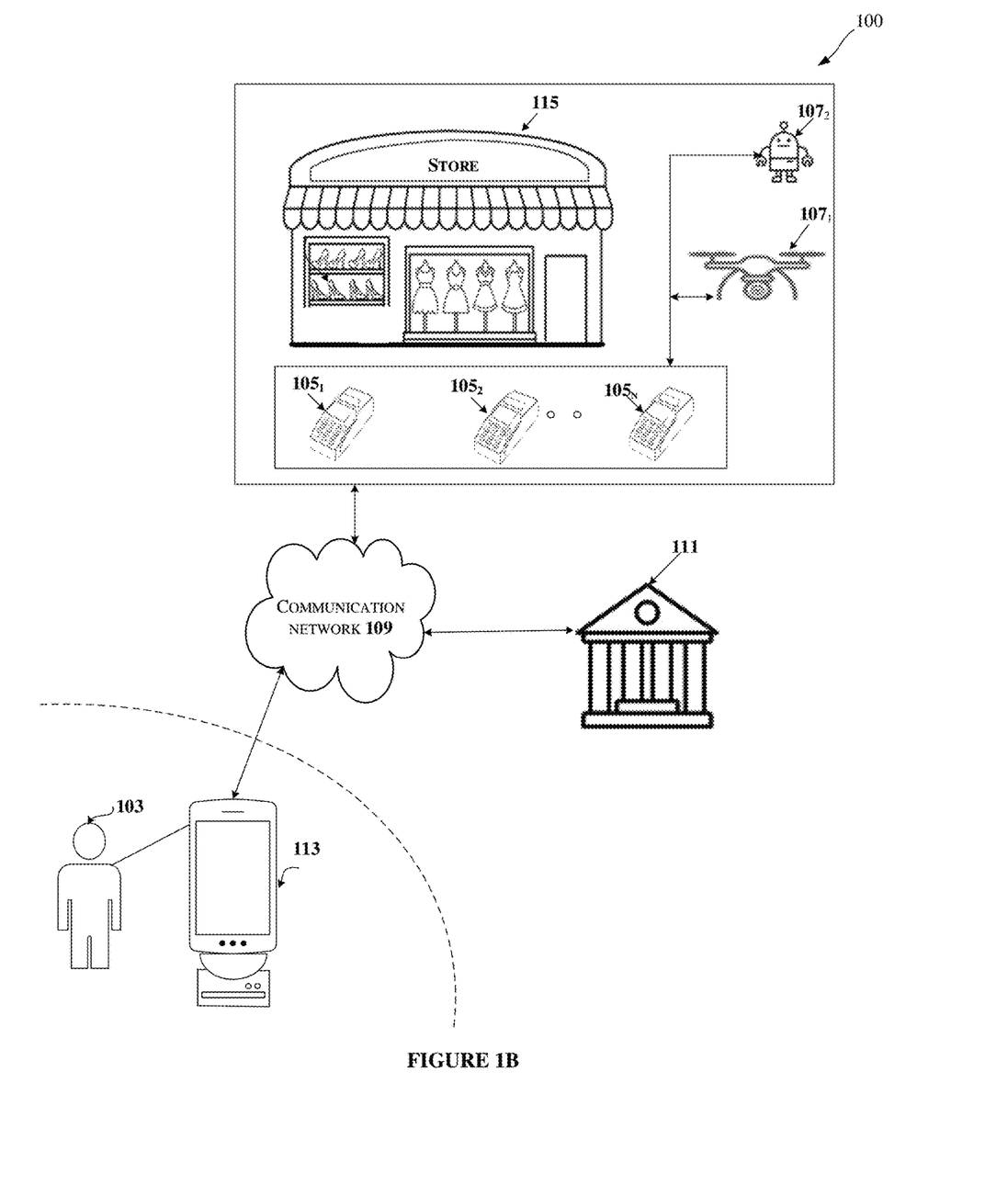

FIG. 1A and FIG. 1B show an exemplary environment for executing card present transaction from a remote environment, in accordance with an embodiment of the present disclosure.

As shown in FIG. 1A, environment 100 includes a first payment terminal 101 associated with a user 103 present at a remote location. The user 103 may initiate a payment for a transaction using the first payment terminal 101 from the remote location. In an embodiment, the remote location may refer to a location where the user 103 is physically present and is away, in terms of distance from the merchant location. In an embodiment, the user 103 making the payment transaction is separated geographically from the merchant. Likewise, the first payment terminal 101 is located separate from a second payment terminal associated with a merchant. Herein, the term "separate" refers to different physical space or geographically distant. In an embodiment, the first payment terminal 101 may be a dedicated Point of Sale (POS) device associated with the user 103. In order to purchase a product or service from the remote location, the user 103 may register with an intermediate agent device 107 for making the transaction for purchase of the product or the service from a merchant location. In an embodiment, the intermediate agent device 107 may be associated with an organization which may provide intermediate agent devices on Product as a Service (PaaS) basis. In an embodiment, the organization may provide the user 103 with a dedicated application in order to hire the intermediate agent device 107 for operating at a particular location. The user 103 may log in to the dedicated application and also communicate with the intermediate agent device 107 using a computing device 113. In an embodiment, the computing device 113 may include, but not limited to, a desktop computer, a Personal Digital Assistant (PDA), a notebook, a smartphone, a tablet, and any other computing devices. A person skilled in the art would understand that, any other computing device for communication with a display unit, not mentioned explicitly, may also be used in the present disclosure. In an embodiment, the intermediate agent device 107 may be a physical device such as, drones, or drones projecting hologram, a robot and the like. A person skilled in the art would understand that any other device, performing functionalities as intermediate agent device 107, not mentioned explicitly, may also be used in the present disclosure.

Consider, the user 103 hires the intermediate agent device 107 for a purchase from a store 115 as shown in FIG. 1A. During registration, the intermediate agent device 107 may store details associated with the user 103 such as, physical address of the user 103 where the user 103 is located currently, payload address of the first payment terminal 101 associated with the user 103 and public key information of the user 103. Thus, the intermediate agent device 107 based on the instructions from the user 103 may reach the store 115 located at a physical environment which is physically separate from the user. On reaching the store 115, the intermediate agent device 107 may communicate with the user 103 through a communication network 109. In an embodiment, the communication network 109 may include, for example, e-commerce network, a peer to peer (P2P) network, wide area network (WAN), wireless network (e.g., using Wireless Application Protocol), the Internet, Wi-Fi, cellular network, etc. In an embodiment, the first payment terminal 101 may be a part of the computing device 113 and may be considered as a single device. For example, a mobile POS device which include, smartphone, tablet or any other wireless device can perform functions of a cash register or electronic point-of-sale terminal (POS terminal) wirelessly. In an embodiment, the first payment terminal 101 may be configurable with the computing device 113. In another embodiment, the first payment terminal 101 and the computing device 113 can be independent, such that each device can be communicatively coupled with each other. FIG. 1B shows exemplary environment for executing card present transaction with a mobile POS device associated with the user 103.

In one embodiment, the intermediate agent device 107 may provide location details of the merchant associated with the store 115 and one or more images of the product being requested by the user 103. The user 103 may communicate and view the one or more images on the computing device 113. Thus, on viewing the one or more images of the product requested, the user 103 may indicate to purchase the product to the intermediate agent device 107. On receiving a confirmation from the user 103 for performing the payment transaction for the product, the intermediate agent device 107 initiates the payment transaction. At this point, the intermediate agent device 107 moves to checkout counter of the store 115 and sends one or more requests to a second payment terminal 105 associated with the store 115.

In an embodiment, the store 115 may include a plurality of second payment terminals 105. In an embodiment, the intermediate agent device 107 may communicate using Near Field Communication (NFC) and/or chip connectivity. On receiving the one or more request, a second payment terminal (1051) among the plurality of second payment terminals 105 may authenticate the intermediate agent device 107. The first payment terminal 101 may receive payment details and configuration information of the second payment terminals 1051 from the intermediate agent device 107. In an embodiment, the intermediate agent device 107 may provide the payment details and configuration information through any secure internet techniques. The intermediate agent device 107 may receive the payment details and the configuration information from the second payment terminal 1051 on successful authentication. In an embodiment, the configuration information may include type of transaction technique supported by the second payment terminal 105 for example, swipe, dip, tap, wave and the like. In an embodiment, the first payment terminal 101 is programmed/configured with different transaction technique such as, the swipe, dip, tap, wave and the like.

On receiving the payment details and the configuration information, the first payment terminal 101 may emulate the second payment terminal 1051 using the configuration information of the second payment terminal 1051 to initiate a payment channel. In an embodiment, a confirmation regarding the initiation of the payment channel is transmitted to the intermediate agent device 107. Thereafter, the first payment terminal 101 may request the user 103 to initiate the payment transaction by using a physical payment card (such as, credit card, payment card, gift card, debit card, prepaid cards, and the like) in the first payment terminal 101. Particularly, the first payment terminal 101 may request the user 103 to either swipe, tap, dip, wave and the like on the first payment terminal 101 based on the configuration of the second payment terminal 105. For example, if the second payment terminal 105 supports payment transaction by swiping the physical payment card, the first payment terminal 101 may request the user 103 to swipe the physical payment card.

Thus, upon initiating the payment, the first payment terminal 101 may receive transaction related data. In an embodiment, the transaction related data is encrypted, by any encryption technique such as, public-private key and the like, by the first payment terminal 101 before communicating to the second payment terminal 105 via the intermediate agent device 107. As used herein, the transaction related data may include any relevant information for performing a payment. For example, the transaction related data may include any sensitive account information and/or personal information that may be used to identify and/or authenticate a user account at an issuer. As such, the transaction related data may include both sensitive and non-sensitive information. Additionally, the transaction related data may include only a portion of account information, personal information, etc., that may be used to perform a transaction. For example, the transaction related data may include the sensitive information associated with a transaction or account and may be sent along with other non-sensitive information that may not be considered payment information (e.g., transaction amount, etc.).

Thereafter, the transaction related data is received by the second payment terminal 105 which sends a transaction message including the received transaction related data to an issuer system 111 for authorization. In an embodiment, the issuer system 111 may refer to a business entity for example, a bank, that maintains financial accounts for a user and often issues a portable user device such as, a credit or debit card to the user.

Thereafter, the first payment terminal 101 may receive a result of the payment transaction from the second payment terminal 105 via the intermediate agent device 107. In an embodiment, the result of the transaction may be a successful transaction. In such case, the first payment terminal 101 may terminate the payment channel with the second payment terminal 105. Alternatively, if the result of the transaction is unsuccessful transaction, the first payment terminal 101 may reinitiate the payment transaction upon receiving approval from the user 103. In an embodiment, the described transaction can be considered as the card present transaction. In an embodiment, the intermediate agent device 107 may be provided with the products for delivering to the user upon 103 on successful payment transaction. In some implementation, the first payment terminal 101 and the intermediate agent device 107 are communicably connected through a wireless network. In some implementation, the second payment terminal 105 and the intermediate agent device 107 are communicably connected through a wireless network.

Figure 2:
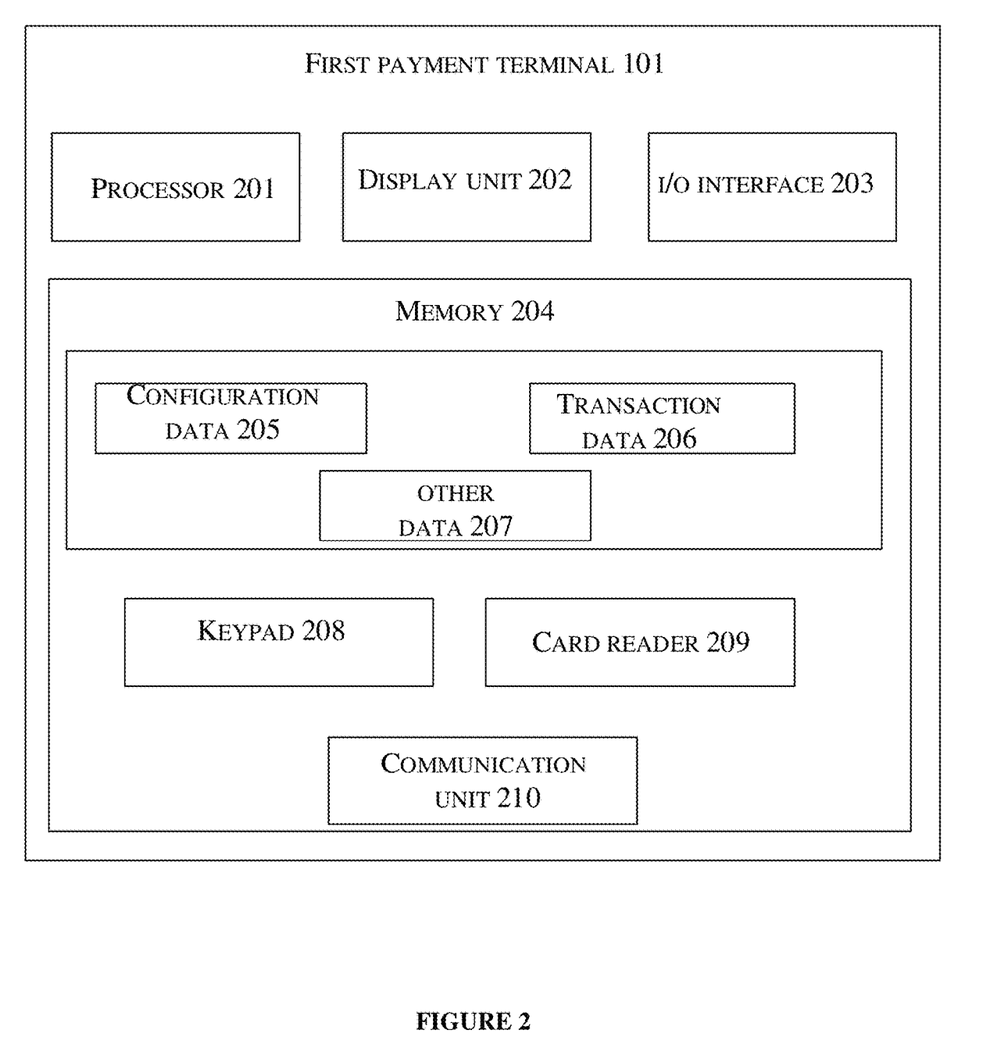
FIG. 2 shows an exemplary detailed block diagram of a first payment terminal, in accordance with embodiments of the present disclosure.

FIG. 2 shows an exemplary detailed block diagram of a first payment terminal, in accordance with embodiments of the present disclosure.

The first payment terminal 101 may include at least one Central Processing Unit ("CPU" or "processor") 201 and a memory 204 for storing instructions executable by the at least one processor 201. The processor 201 may comprise at least one data processor for executing program components for executing user or system-generated requests. The memory 204 is communicatively coupled to the processor 201. The first payment terminal 101 further comprises an Input/Output (I/O) interface 203. The I/O interface 203 is coupled with the processor 201 through which an input signal or/and an output signal is communicated.

In one embodiment, the first payment terminal 101 may include, for example, a display unit 202, a keypad 208, a card reader 209, a communication unit 210. It will be appreciated that such aforementioned units may be represented as a single unit or a combination of different units.

The display unit 202 may be housed on the first payment terminal 101 and communicatively coupled to the processor 201. The display unit 202 may be used to display various information like configuration details, payment amount of the ongoing transaction and result of the transaction from the second payment terminal 105 for example success or failure.

The keypad 208 may be housed on the first payment terminal 101 and communicatively coupled to the processor 201. The keypad 208 may be used to receive input from the user 103. The input from the user 103 may include, secure pin used for authorizing the transaction. In an embodiment, keypad 208 may be implemented as a digital or virtual keypad on display unit 202. For example, display unit 202 may include touch-sensitive inputs that detect user inputs.

The card reader 209 may be housed on the first payment terminal 101 and communicatively coupled to the processor 201. The card reader 209 may be capable of extracting the details of the physical payment card used for making the payments. The details of the physical payment card may include primary account number and issuer identification number. The card reader 209 extracts the details of the physical payment card using information encoded in the magnetic stripe on the physical payment card or using information stored on integrated circuits. In another embodiment, card reader 209 may be capable of extracting the details of the physical payment card via a wireless communication between the physical payment card and the card reader 209, such as via Near-Field Communication (NFC), Bluetooth, or a similar wireless protocol.

The communication unit 210 may be programmed or configured for sending and receiving information from the intermediate agent device 107.

In one embodiment, the data stored in the memory 204 may include configuration data 205, transaction data 206 and other data 207. The configuration data 205 may include details regarding the configuration associated with the second payment terminal 105 received from the intermediate agent device 107. The configuration may include details on type of transaction supported for the physical payment card. For example, if the second payment terminal 105 supports swipe, tap, dip, wave for the transaction. The transaction data 206 may include any relevant information for performing a payment. For example, the transaction data 206 may include any sensitive account information and/or personal information that may be used to identify and/or authenticate a user account at an issuer system. As such, the transaction data 206 may include both sensitive and non-sensitive information. Additionally, the transaction data 206 may include only a portion of account information, personal information, etc., that may be used to perform the transaction.

In an embodiment, other data 207 may include information necessary for encrypting and decrypting transaction related data and payment details.

Figure 3:
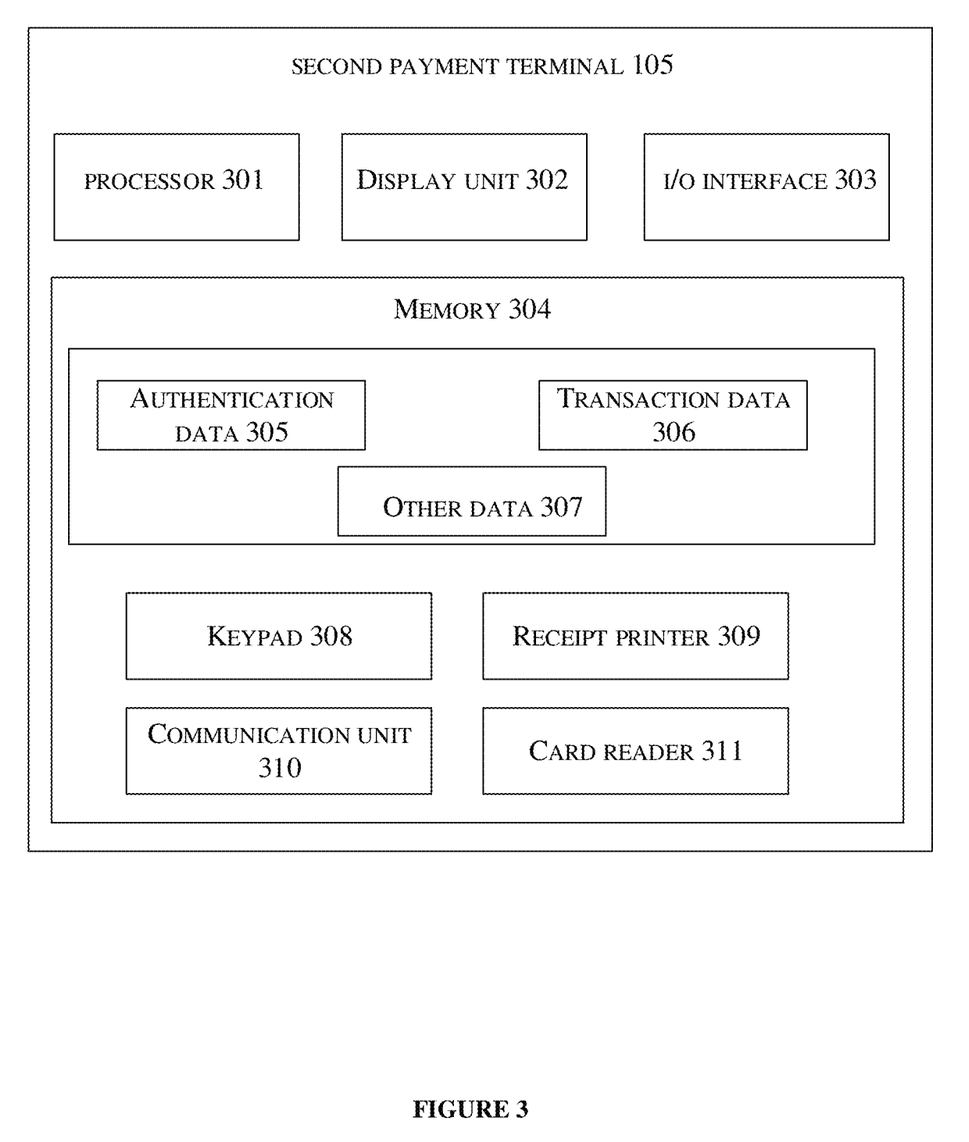
FIG. 3 shows an exemplary detailed block diagram of a second payment terminal, in accordance with embodiments of the present disclosure.

FIG. 3 shows an exemplary detailed block diagram of a second payment terminal, in accordance with embodiments of the present disclosure.

The second payment terminal 105 may include at least one Central Processing Unit ("CPU" or "processor") 301 and a memory 304 storing instructions executable by the at least one processor 301. The processor 301 may comprise at least one data processor for executing program components for executing user or system-generated requests. The memory 304 is communicatively coupled to the processor 301. The second payment terminal 105 further comprises an Input/Output (I/O) interface 303. The I/O interface 303 is coupled with the processor 301 through which an input signal or/and an output signal is communicated.

In one embodiment, the second payment terminal 105 may include, for example, a display unit 302, a keypad 308, a receipt printer 309, a communication unit 310 and a card reader 311. It will be appreciated that such aforementioned units may be represented as a single unit or a combination of different units.

The display unit 302 may be housed on the second payment terminal 105 and communicatively coupled to the processor 301. The display unit 302 may be used to display various information like merchant details, payment amount of an ongoing transaction, authorization response from the issuer for example success or failure.

The keypad 308 may be housed on the second payment terminal 105 and communicatively coupled to the processor 301. The keypad 308 may be used to receive input from the user 103. In an embodiment, keypad 308 may be implemented as a digital or virtual keypad on display unit 302. For example, display unit 302 may include touch-sensitive inputs that detect user inputs.

The receipt printer 309 may be housed on the second payment terminal 105 and communicatively coupled to the processor 301. The receipt printer 309 may be used to generate a hard copy (paper copy) of the transaction details, the details regarding the gateway, details of the physical payment card, the payment amount of a transaction and/or the result of a transaction.

The communication unit 310 may be programmed or configured for sending and receiving information from the issuer system 111 and the first payment device via the intermediate agent device 107.

The card reader 311 may be housed on the second payment terminal 105 and communicatively coupled to the processor 301. The card reader 311 may be capable of extracting the details of the physical payment card used for making the payments. The details of the physical payment card may include primary account number and issuer identification number. The card reader 311 extracts the details of the physical payment card using information encoded in the magnetic stripe on the physical payment card or using information stored on integrated circuits. In another embodiment, card reader 311 may be capable of extracting the details of the physical payment card via a wireless communication between the physical payment card and the card reader 311, such as via Near-Field Communication (NFC), Bluetooth, or a similar wireless protocol.

In one embodiment, the data stored in the memory 304 may include authentication data 305, transaction data 306 and other data 307. The authentication data 305 may include details regarding the intermediate agent device 107 which may be sending request for connection. The transaction data 306 may include any relevant information for performing a payment. For example, the transaction data 306 may include any sensitive account information and/or personal information that may be used to identify and/or authenticate a user account at an issuer. As such, the transaction data 306 may include both sensitive and non-sensitive information received from the first payment terminal 101.

In an embodiment, other data 307 may include information necessary for encrypting and decrypting transaction related data and payment details.

Figure 4:
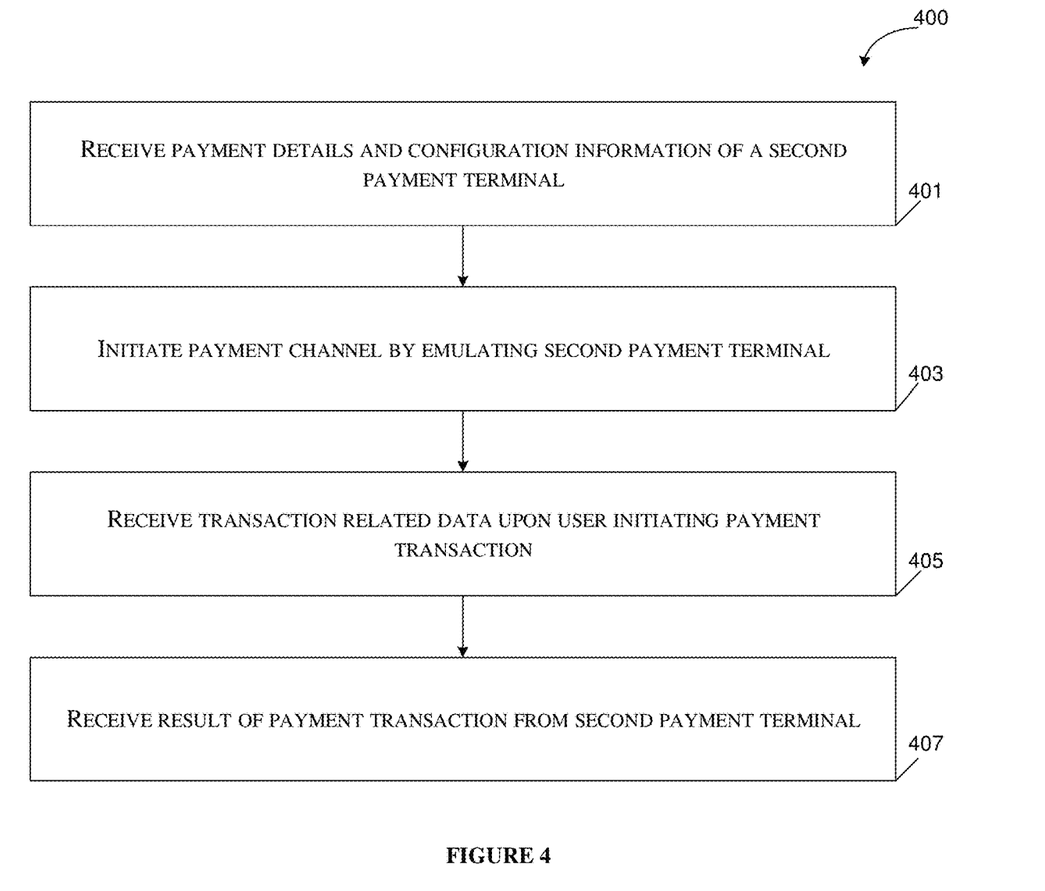
FIG. 4 shows a flow chart illustrating method steps for executing a card present transaction dynamically from a remote environment, in accordance with an embodiment of the present disclosure.

FIG. 4 shows a flow chart illustrating method steps for executing a card present transaction dynamically from a remote environment, in accordance with an embodiment of the present disclosure.

The order in which the method 400 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

As illustrated in FIG. 4, the method 400 may comprise one or more steps for executing card present transaction using the first payment terminal 101 associated with the user 103 in the remote environment. The user 103 comprises the dedicated first payment terminal 101 for making the payment transaction. The user 103 may preregister with the intermediate agent device 107 for visiting a merchant location and performing the transaction. The user 103 may request the intermediate agent device 107 for a purchase or order consumables or goods from the merchant which is physically separate from the user 103. The user 103 initiates the payment transaction in the first payment terminal 101 which is communicably connected through a wireless network with the intermediate agent device 107. The intermediate agent device 107 provides details received from the first payment terminal 101 to the second payment terminal 105 which is associated with the merchant and located at the merchant location. The user 103 receives the data from the intermediate agent device 107 at the computing device 113 associated with the user 103. The data includes location details of the merchant and one or more images of the product being requested from the merchant. Further, the second payment terminal 105 may complete the payment process.

At the step 401, the first payment terminal 101 receives the payment details and the configuration information of the second payment terminal 105 which is associated with the merchant located separate from the first payment terminal. Particularly, the merchant is physically separate from the first payment terminal 101. The first payment terminal 101 receives the payment details and the configuration information through the intermediate agent device 107 which is physically present at the merchant location based on instructions from the user 103 of the first payment terminal 101. The intermediate agent device 107 may receive the payment details and configuration information from the second payment terminal 105 upon initiating the transaction at the second payment terminal 105 on receiving the confirmation from the user 103 for performing the payment transaction for the purchase of the product.

At block 403, the first payment terminal 101 may initiate the payment channel by emulating the second payment terminal 105 using the configuration details received from the intermediate agent device 107. The configuration details may include if the second payment terminal 105 supports the payment transaction by swipe, dip, wave, tap and the like. The first payment terminal 101 may transmit the confirmation regarding the initiation of the payment channel to the intermediate agent device 107 for indicating to the second payment terminal 105.

At block 405, the first payment terminal 101 may receive the transaction related data once the user initiates the payment transaction by using the physical payment card in the first payment terminal 101. Particularly, once the payment channel is initiated, the user 103 may be requested to either swipe, dip, tap, wave the physical payment card in the first payment terminal 101 for the payment. On receiving the transaction related data, the first payment terminal 101 may encrypt the transaction related data by public key before communicating to the second payment terminal 105 via the intermediate agent device 107.

At block 407 the first payment terminal 101 may receive the result of the payment transaction from the second payment terminal 105 via the intermediate agent device 107. The second payment terminal 105 on receiving the transaction related data from the intermediate agent device 107 may send the transaction message comprising transaction related data to the issuer system 111 for authorization. The first payment terminal 101 may terminate the payment channel with the second payment terminal 105 if the result of the transaction is successful. Alternatively, the first payment terminal 101 may may reinitiate the payment transaction on identifying the result of the transaction is unsuccessful after receiving approval from the user 103.

The encryption and decryption of data may be performed using one or more existing techniques.

Figure 5:
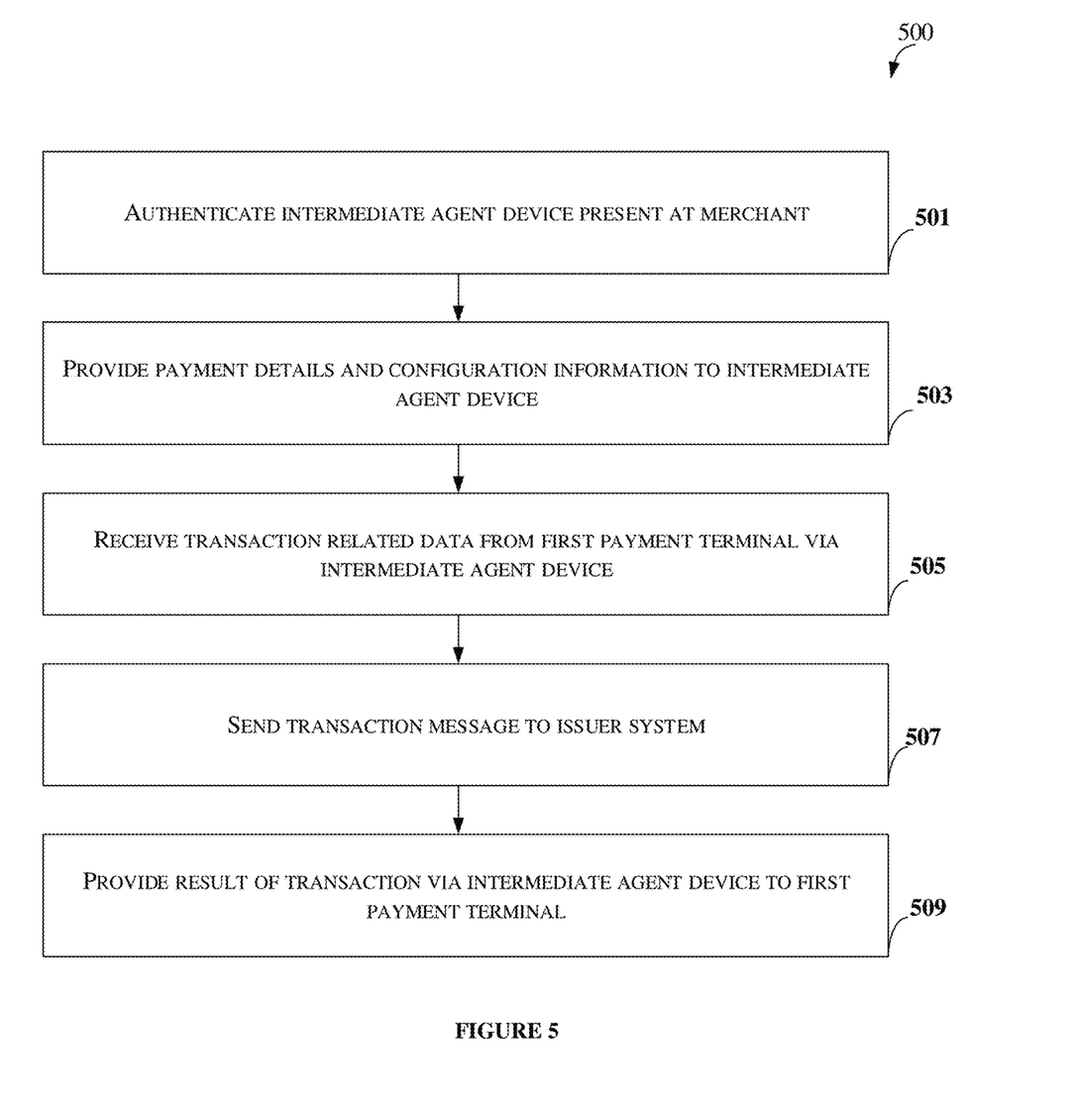
FIG. 5 shows a flow chart illustrating method steps for executing a card present transaction dynamically at a second payment terminal, in accordance with an embodiment of the present disclosure.

FIG. 5 shows a flow chart illustrating method steps for executing a card present transaction dynamically at a second payment terminal, in accordance with an embodiment of the present disclosure. The second payment terminal 105 is located at the merchant location which is separate physically from the first payment terminal 101 associated with the user 103.

The order in which the method 500 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At the step 501, the second payment terminal 105 may authenticate the intermediate agent device 107 present at the merchant upon receiving the one or more requests from the intermediate agent device 107 for the payment transaction. The intermediate agent device 107 may send the one or more requests upon receiving approval of the user 103 for initiating the payment transaction for the product from the merchant.

At block 503, the second payment terminal 105 may provide the payment details and the configuration information to the intermediate agent device 107 after successful authentication for sending to the first payment terminal 101 associated with the user 103. On receiving the payment details and the configuration information, the first payment terminal 101 establishes the payment channel by emulating the second payment terminal 105 using the configuration information.

At block 505, the second payment terminal 105 may receive the transaction related data from the first payment terminal 101 via the intermediate agent device 107 upon establishment of the payment channel by the first payment terminal 101. The transaction related data is captured when the user 103 initiates payment for the transaction using the physical payment card in the first payment terminal 101. In an embodiment, the transaction related data is decrypted by the intermediate agent device 107 before transmitting to the second payment terminal 105. In an embodiment, the second payment terminal 105 may refuse the payment transaction after receiving the transaction related data on identifying the first payment terminal 101 to be at least one of a fraudulent and blacklisted payment terminal.

At block 507, the second payment terminal 105 may send the transaction message comprising the transaction related data to the issuer system 111 for authorization.

At block 509, the second payment terminal 105 may provide the result of the transaction via the intermediate agent device 107 to the first payment terminal 101 upon receiving from the issuer system 111. In case the payment transaction is successful, the intermediate agent device 107 is provided with the one or more products for delivering to the user 103.

The authorization and authentication of a transaction can be performed using any existing techniques.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Thus, the system and computer implemented method for dynamic merchant configuration in a payment terminal for transacting in a virtual environment enables a user or customer to make payments for purchasing consumables or goods in a virtual environment using a physical. Further, a payment terminal is configured to change the merchant and gateway based on the virtual location of a consumer or a user in a virtual environment. Thus, the payment terminal is agnostic of the merchant's gateway or acquirers gateway. Furthermore, payments in virtual environment to a real vendor in the physical world is achieved without the involvement of the intermediaries. Thus, the money gets transferred directly to the merchant's bank account.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:
receiving, by an intermediate agent device, a confirmation from a user for performing a payment transaction from a dedicated application on a computing device of the user;
authenticating, by the intermediate agent device, with a second point-of-sale (POS) terminal associated with a merchant, wherein the intermediate agent device and the second POS terminal are communicably connected through a first wireless network:
upon successfully authenticating with the second POS terminal, receiving, by the intermediate agent device, payment details and configuration information from the second POS terminal after receiving the confirmation from the user;
receiving, by a first POS terminal located separate from the second POS terminal, the payment details and configuration information from the intermediate agent device, wherein the intermediate agent device and the first POS terminal are communicably connected through a second wireless network;
initiating, by the first POS terminal, a payment channel by emulating the second POS terminal using the configuration information, wherein a confirmation regarding the initiation of the payment channel is transmitted to the intermediate agent device;
receiving, by the first POS terminal, transaction related data upon the user initiating the payment transaction using a physical payment card in the first POS terminal, wherein the transaction related data is communicated to the intermediate agent device;
communicating, by the intermediate agent device, the transaction related data to the second POS terminal, wherein the second POS terminal sends a transaction message comprising transaction related data to an issuer system for authorization upon receiving the transaction related data from the intermediate agent device;
receiving, by the intermediate agent device, a result of the payment transaction from the second POS terminal; and
receiving, by the first POS terminal, the result of the payment transaction from the intermediate agent device.

2. The method of claim 1, wherein the merchant is located at a physical environment separate from the first POS terminal.

3. The method of claim 1 further comprising receiving at a display unit associated with the user, data associated with the merchant from the intermediate agent device, wherein the data associated with the merchant comprises location details of the merchant and one or more images of a product being requested from the merchant.

4. The method of claim 1, wherein the intermediate agent device is preregistered with the user and is present at a location of the merchant for initiating the payment transaction.

5. The method of claim 1, wherein receiving the result of the transaction from the second POS terminal comprises at least one of:
terminating the payment channel with the second POS terminal on identifying the result of the transaction as successful; or
reinitiating the payment transaction on identifying the result of the transaction as unsuccessful upon receiving approval from the user.

6. The method of claim 1, wherein the transaction related data is encrypted by the first POS terminal before communicating to the second POS terminal via the intermediate agent device.

7. A system comprising:
an intermediate agent device configured to:
receive a confirmation from a user for performing a payment transaction from a dedicated application on a computing device of the user;
authenticate with a second point-of-sale (POS) terminal associated with a merchant, wherein the intermediate agent device and the second POS terminal are communicably connected through a first wireless network; and
upon successfully authenticating with the second POS terminal, receive payment details and configuration information from the second POS terminal after receiving the confirmation from the user; and
a first POS terminal located separate from the second POS terminal and configured to:
receive the payment details and configuration information from the intermediate agent device, wherein the intermediate agent device and the first POS terminal are communicably connected through a second wireless network;
initiate a payment channel by emulating the second POS terminal using the configuration details, wherein a confirmation regarding the initiation of the payment channel is transmitted to the intermediate agent device; and receive transaction related data upon the user initiating payment for the transaction using a physical payment card in the first POS terminal, wherein the transaction related data is communicated to the intermediate agent device, wherein the intermediate agent device is further configured to:

communicate the transaction related data to the second POS terminal, wherein the second POS terminal sends a transaction message comprising transaction related data to an issuer system for authorization upon receiving the transaction related data from the intermediate agent device; and receive a result of the transaction from the second POS terminal, and wherein the first POS terminal is further configured to:

receive the result of the payment transaction from the intermediate agent device.

8. The system of claim 7, wherein the merchant is located at a physical environment separate from the first POS terminal.

9. The system of claim 7, further comprising a display device associated with the user and configured to receive data associated with the merchant from the intermediate agent device, wherein the data associated with the merchant comprises location details of the merchant and one or more images of a product being requested from the merchant.

10. The system of claim 7, wherein the intermediate agent device is preregistered with the user and is present at a location of the merchant for initiating the payment transaction.

11. The system of claim 7, wherein receiving the result of the transaction from the second POS terminal comprises at least one of:

terminating the payment channel with the second POS terminal on identifying the result of the transaction as successful; or reinitiating a payment transaction on identifying the result of the transaction as unsuccessful upon receiving approval from the user.

12. The system of claim 7, wherein the first POS terminal is further configured to encrypt the transaction related data before communicating to the intermediate agent device.

* * * * *